United States Patent [19]
Kahan et al.

[11] 3,852,434
[45] Dec. 3, 1974

[54] POTENTIATION OF (−) CIS-1,2-EPOXYPROPYL)PHOSPHONIC ACID AND ANALOGUES THEREOF

[75] Inventors: Frederick M. Kahan; Patrick J. Cassidy, both of Rahway, N.J.

[73] Assignee: Merck & Co., Inc., Rahway, N.J.

[22] Filed: Apr. 20, 1973

[21] Appl. No.: 353,046

Related U.S. Application Data

[63] Continuation of Ser. No. 71,247, Sept. 11, 1970, abandoned, which is a continuation-in-part of Ser. No. 863,351, Oct. 2, 1969, abandoned.

[52] U.S. Cl............................... 424/180, 424/203
[51] Int. Cl....................... A61k 21/00, A61k 27/00
[58] Field of Search........................... 424/203, 180

[56] References Cited
UNITED STATES PATENTS
3,496,080  2/1970  Harris............................. 204/158

Primary Examiner—Sam Rosen
Attorney, Agent, or Firm—James A. Arno; Hesna J. Pfeiffer; J. Jerome Behan

[57] ABSTRACT

The activity of antibiotics is potentiated by compounds that stimulate the biosynthesis of transport mechanisms which mediate the entry of the antibiotic into the cell. Methods for finding such compounds and for using them to potentiate antibiotic activity are provided. Thus, phosphonomycin, its analogs and derivatives thereof are potentiated by compounds capable of inducing directly or following metabolism the α-glycerophosphate or the hexose-6-phosphate transport systems of bacteria.

14 Claims, No Drawings

POTENTIATION OF (−) (CIS-1,2-EPOXYPROPYL)PHOSPHONIC ACID AND ANALOGUES THEREOF

This application is a continuation of application Ser. No. 71,247, filed Sept. 11, 1970 which in turn was a continuation in part of our application Ser. No. 863,351 filed Oct. 2, 1969, both now abandoned.

BACKGROUND OF THE INVENTION

The elimination of bacterial infections by antibiotic therapy is often thwarted by practical difficulties for achieving sufficiently high levels of the antibiotic at the site of infection. In cases where only marginally effective concentrations are employed, antibiotic resistant organisms frequently emerge from the original infecting population. This problem is important in the case of the new antibiotic phosphonomycin [(-)(cis-1,2-epoxypropyl) phosphonic acid] since it is excreted rapidly and its action is antagonized by common constituents of plasma and urine such as glucose and phosphate, respectively. In addition, the antibiotic is occasionally found to be ineffective against pre-existent mutants which are relatively resistant to this antibiotic and occur within many bacterial populations. Accordingly, methods of overcoming these difficulties in antibiotic therapy have been sought.

SUMMARY OF THE INVENTION

It is an object of the present invention to provide a method of enhancing the sensitivity of microorganisms to antibiotics to permit therapy at tissue levels obtainable by reasonable dosage. Another object is to prevent the emergence of resistant organisms of bacteria during antibiotic therapy. A further object is to provide methods of conferring sensitivity on bacteria populations that are otherwise untreatable, either through prior acquisition of resistance to the antibiotic or through intrinsic insensitivity to the antibiotic. An additional object is to provide a method comprising the use of appropriate inducers for evoking new pathways and/or enhancing the activity of already existing pathways for the uptake of antibiotics by using appropriate inducers. Another object is to provide methods for detecting compounds which act as inducers that evoke hitherto unsuspected pathways for the uptake of antibiotics by bacteria. Also, it is an object to provide a method for enhancing the $\alpha$-glycerophosphate transport pathway responsible for uptake of antibiotics and for evoking the glucose-6-phosphate transport pathway. Other objects will be apparent from the detailed description of our invention hereinafter provided.

DETAILED DESCRIPTION OF THE INVENTION

In accordance with the present invention, we have found that the activity of antibiotics is greatly potentiated by compounds which act to enhance an existing pathway or provide new transport pathways in bacteria. Thus, compounds enhancing the activity of the $\alpha$-glycerophosphate transport system, or evoking de novo a hexose-phosphate system in bacteria can be used either prior to treatment with an antibiotic or concomitantly with an antibiotic to potentiate its activity. For example, microorganisms that exhibit no evidence of sensitivity to a particular antibiotic either because of the absence of a transport pathway or the presence of only low levels of suitable transport pathways are rendered sensitive to the antibiotic by exposure to inducers to provide a suitable pathway or an enhancement of the existing pathway. By the term "inducer" as used herein is meant a compound used that either directly, or on metabolism by host or bacterium, interacts with the regulatory machinery of the cell that controls the biosynthesis of specific transport pathways. In those cases where less than the maximal rates of synthesis of the susceptible transport system occurs prior to the introduction of the inducer to the media, the latter is said to enhance the rate of their synthesis and thus enhance the activity per cell of the transport system. In those cases where the rate of synthesis of a particular class is virtually zero in the absence of inducers, these compounds are said to evoke the latent potential of the cell to produce the transport pathway. The inducer need not be, but frequently is, a substrate for one of the group of proteins it enhances or evokes.

In accordance with a specific embodiment of this invention, we have found that certain compounds act as inducers with bacteria either prior to or concomitantly with phosphonomycin, its analogs and their derivatives and thereby greatly potentiate the activity of these antibiotic substances. These compounds which act as inducers either enhance the activity of the $\alpha$-glycerophosphate transport pathway or evoke a new transport pathway such as a hexosephosphate transport system. By virtue of the activity of these inducers of these transport systems, we have found that organisms thus stimulated accumulate higher levels of phosphonomycin and are thus killed by relatively small doses of the antibiotic. Organisms that show no evidence of sensitivity toward phosphonomycin either because of low levels of $\alpha$-glycerophosphate system present, or its absence in the organisms as a result of mutation to phosphonomycin resistance, are rendered sensitive to this antibiotic by the evocation of the second, hexose-phosphate transport pathway. Another advantage of the present invention is that those organisms possessing two or more independent transport systems show much lower incidence of antibiotic resistance since the simultaneous loss by mutation of two pathways is rare in microorganisms. Methods for finding compounds capable of acting as inducers of these, and other transport systems providing access of phosphonomycin antibiotics to the cell, are also provided. Further, evidence is provided for the induction by riboflavin-5-phosphate of a third phosphonomycin transport pathway. It should be emphasized that the inducers described herein are not antibiotics or antimetabolites but stimulate the biosynthesis of natural nutrient transport mechanisms that mediate the entry into the cell of the phosphonomycin antibiotic. This phenomenon applies uniquely to the phosphonomycin antibiotics since it has been observed that bacterial strains thus induced show no increase in sensitivity to other antibiotics tested. An important advantageous consequence of using the compounds serving as inducers is that the inducer need not be present when the transport systems mediate the entry of antibiotic into the bacterium. Thus, inducers that might antagonize the transport of the phosphonomy in antibiotic when simultaneously present with such antibiotic by competition for the transport proteins may be added well prior to the administration of the antibiotic and be given opportunity to dissipate within the host. Additionally, the process of the present invention does not require, in contrast to the conventional synergy by administration of two antibiotics, that the blood levels and excretion rate of two or more components be matched with each other. Therefore, the difficulty encountered in the past of indeed establishing potent levels of two different synergizing drugs is eliminated by the present invention since the inducers used need only to induce the bacterium and then disappear; the transport proteins produced remain and thereby provide a means of entry of antibiotic into the bacteria cell.

Pursuant to another embodiment of this invention, it is now found that certain polyhydric alcohols and derivatives thereof act as inducers either to enhance the activity of the α-glycerophosphate transport system or evoke a hexose-6-phosphate transport system and therefore coact with phosphonomycin antibiotics in controlling such bacteria. Thus, glycerol, a phosphatide and sugar phosphates have been found to be suitable inducers. Sugar phosphates which represent preferred embodiments of the present invention that might be mentioned are glucose-6-phosphate, fructose-6-phosphate, mannose-6-phosphate, glucose-1-phosphate, 2-deoxy-glucose-6-phosphate, 2-amino-2-deoxy-glucose-6-phosphate, glucose-1,6-diphosphate, galactose-6-phosphate, ribose-5-phosphate and the like. Thus, when susceptible bacteria are contacted with these sugar phosphates either prior to or concomitantly with a phosphonomycin antibiotic, such phosphates or an active metabolite derived therefrom potentiate the activity of the antibiotic, and it is then possible to use much smaller amounts of the antibiotic than would otherwise be necessary to control the pathogen. This observed co-action in inducing a hexose-6-phosphate transport system to potentiate the effectiveness of the phosphonomycin antibiotic is indeed remarkable and entirely unexpected. For example, in tests in mice against *E. coli* it is found that using a combination of glucose-6-phosphate and the antibiotic, the dose of phosphonomycin antibiotic needed to protect one-half the mice is less than one-tenth that required of antibiotic alone.

Alternatively, in place of using a sugar phosphate, it is possible to generate inducers in situ by the injection of suitable enzymes or substrates into the host. For example, the hexokinase of microbial, yeast, animal or human origin can utilize the free ATP and glucose found in tissue fluids to generate glucose-6-phosphate. It is preferable to use human hexokinase, glycerokinase or glucokinase in order to minimize possible problems of antigenicity. Also, it is possible to utilize the simultaneous injection with these enzymes of an appropriate high energy phosphate donor such as adenosine-5'-triphosphate or phosphoenolpyruvate and the ingestion or injection of suitable sugar acceptors such as fructose, mannose, glucossamine which in their phosphorylated form are inducers of the transport systems. Also, groups of enzymes can be administered which ultimately give rise to the demonstrated inducers, for example glycogen phosphorylase which acting on either host-derived or injected glycogen would generate first glucose-1-phosphate which, by the action of the endogenous or added phosphoglucomutase is converted to glucose-6-phosphate. The utility of any combination of enzymes and substrates may be determined (as a practical alternative to testing them directly in infected animals or humans) by adding these substances to animal or human plasma, incubating them at body temperature for various periods of time, and then testing the incubation mixture (following inactivation of the enzyme) for its ability to sensitize phosphonomycin resistant microorganisms to phosphonomycin. Such a highly sensitive test system is hereinafter described. An alternative system of searching for enzymes or substrates or combinations of both, effective in generating inducers of phosphonomycin transport in situ consists of injecting these substances into the healthy animal or human and then sampling the blood for activity in the test system hereinafter described. It is essential in assaying such samples to first remove the blood cells and heat-inactivate the plasma to eliminate all enzymes of natural or injected origin that generate inducers on the test plate itself rather than in the injected host. Methods and systems for the detection and classification of inducers of two of the recognized pathways of phosphonomycin entry into bacteria (the α-glycerophosphate transport system and a hexose-6-phosphate transport system) are presented in detail. These methods and systems may readily be generalized for use in detecting further useful inducers of these and hitherto unrecognized transport pathways with any bacterial strain it is desired to treat with phosphonomycin, its analogs and their derivatives. This general approach consists of isolating a phosphonomycin-resistant mutant strain from a sensitive example of the strain to be treated, and establishing that this resistance is indeed due to a failure of phosphonomycin to penetrate the cell in adequate amounts. This loss of wild-type transport can be established either by demonstrating the concomitant loss of the α-glycerophosphate metabolizing capacity of the mutant strain, or by demonstrating a decreased level of phosphonomycin itself within such mutants when they are exposed to the medicated media. Such mutants are then placed in either liquid or solid media containing much higher levels of phosphonomycin than the parent strain would survive, but levels still permitting growth of the resistant mutant. Under these conditions, any degree of induction of additional routes of penetration for phosphonomycin will be sensitively detected as inhibition of bacterial growth owing to the high levels of antibiotic that surround the mutant. Induction can be achieved either by inclusion of the potential inducer together with phosphonomycin in sensitivity discs or by dispersal of the inducer throughout the agar or liquid medium. Alternatively, in those cases where it is anticipated that the inducer will itself compete with drug for the use of the new entry process (as in the case of α-glycerophosphate itself), one can expose the inoculum of mutant organisms to the inducer prior to their combination with phosphonomycin, then having either washed out the competing inducer by any cell separation technique (filtration, centrifugation, etc.), one may combine these preinduced cells with phosphonomycin in liquid medium. Having detected new compounds capable of yielding growth inhibition, it can readily be demonstrated whether the compound used by itself yields inhibition of growth in media lacking added phosphonomycin.

The coaction of the inducers described herein and the phosphonomycin antibiotic provide a valuable means for controlling and eliminating bacteria which are otherwise resistant to the action of a phosphonomycin antibiotic. Thus, a combination of the inducer and the antibiotic in a suitable vehicle, which can be prepared by procedures well known in this art, can be used topically for the treatment of infections. Alternatively, the inducer and the antibiotic can be administered parenterally or orally to an infected animal or human host either separately or in combination in a suitable pharmaceutical carrier, or one can be administered parenterally and the second can be given orally. These pharmaceutical forms of the antibiotic and/or the inducing compounds can be prepared in accordance with procedures well known in this art using suitable pharmaceutical solid or liquid diluents. The compositions can be in the form of tablets, powders, granules, capsules, suspensions, solutions, elixirs, syrups or other dosage forms particularly suitable for oral administration. It can also be in the form of sterilized solutions or suspensions for parenteral administration. In such products the sterile vehicle can be a sterile solution or suspension. The compositions containing the antibiotic can be admixed with solid diluents and/or tableting adjuvants such as corn starch, talc, stearic acid, magnesium stearate, gums and the like. The usual encapsulating or tableting materials useful in preparing pharmaceutical products can be employed so long as they are not incompatible with the antibiotic or the inducing compounds. These dosage forms can contain from 25 to 500 mg. of the active substances and can be administered in doses given 1 to 6 times per day depending upon the patient's age and condition, the infection and the mode of administration.

The term "phosphonomycin antibiotic" as used herein includes phosphonomycin and its derivatives of the formula

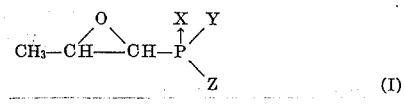

and the corresponding analogs of the formula

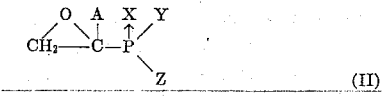

where A represents hydrogen or lower alkyl, X represents oxygen or sulfur, Y and Z can be the same or different and represent OH, OR, $-NR_1R_2$,

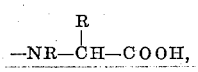

$-NROR$, $-NRNR_1R_2$, $-NR-N=CR_1R_2$,

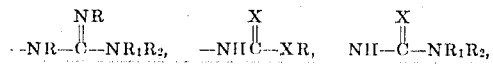

$-N=C=X$, or $-N_3$, wherein X is oxygen or sulfur, R is hydrogen, a hydrocarbyl group or substituted hydrocarbyl group and $R_1$ and $R_2$ represent hydrogen, acyl, or a hydrocarbyl or substituted hydrocarbyl group. Also included in Formulas I and II are the inorganic and organic salts of those compounds where Y and/or Z is —OH, and the cyclic derivatives where Y and Z are connected via a residue of a polyfunctional hydrocarbyl compound such as a straight or branched chain alkylene, aralkylene, and arylene polyamine, and aminoalcohol and the like such as ethylenediamine, monoethanolamine, phenylenediamine, naphthalenediamine, o-aminophenol and the like and those cyclic derivatives where $-NR_1R_2$ represents the residue of a cyclic primary or secondary amine such as, for example, morpholine, piperidine or pyrrolidine.

Where R, $R_1$ or $R_2$ in Formulas I and II represent a hydrocarbyl or substituted hydrocarbyl radical, such radical can be an aliphatic, cycloaliphatic, araliphatic, aromatic or heterocyclic radical which can, if desired, be further substituted. Thus, for example, it can be aliphatic, such as substituted or unsubstituted alkyl, alkenyl, or alkynyl. Examples of R, $R_1$ and $R_2$ representing an araliphatic radical are those cases where it is aralkyl or substituted aralkyl such as benzyl, phenethyl, phenylpropyl, p-halobenzyl and o-, m- or p-alkoxybenzyl, nitrobenzyl, aminophenethyl, pyridylethyl, nitrofurylmethyl, thienylpropyl and the like.

R, $R_1$ and $R_2$ also represent an aryl or substituted aryl radical such as phenyl, naphthyl or substituted phenyl.

Thus, in accordance with the foregoing, the amide group or groups can be derived from compounds which are themselves antibacterial. Examples of such compounds that might be mentioned are 6-aminopenicillanic acid, 7-aminocephalosporanic acid, sulfa compounds such as sulfanilamide, sulfadiazine, sulfamerizine, sulfamethazine, sulfadimetine, sulfapyridine, sulfathiazole, sulfisoxazole, thiodiazole, sulfacetamide, sulfaguanidine, sulfaquinoxaline, and p-aminophenylsulfonamide, and p-aminobenzenesulfonic acid, antibiotic agents such as ampicillin, streptomycin, dihydrostreptomycin, cycloserine, cephaloglycin, cephalixin, and the like.

Those compounds of Formulas I and II which are acidic, i.e., the free acids, may form salts, and such salts constitute a preferred aspect of the invention because they are more stable than the free acid. As will be appreciated by those skilled in this art, the compounds of Formulas I and II where at least one of Y and Z is —OH will form organic and inorganic salts, and both are contemplated by this invention. Examples of such salts are inorganic metallic salts such as the sodium, aluminum, potassium, calcium, magnesium, silver and iron salts. Organic salts that may be mentioned as representative include the salts with primary, secondary or tertiary amines such as monoalkylamines, dialkylamines, trialkylamines and nitrogen-containing heterocyclic amines. Representative examples are salts with amines such as α-phenethylamine, diethylamine, quinine, brucine, lysine, protamine, arginine, procaine, ethanolamine, morphine, benzylamine, ethylenediamine, N,N'-dibenzylethylenediamine, diethanolamine, piperazine, dimethylaminoethanol, 2-amino-2-methyl-1-propanol, theophylline, esters of amino acids, and N-methylglucamine. If desired, the basic moiety of the salt may be a biologically-active amine such as erythromycin, oleandomycin or novobiocin.

The monoamide-monoester derivatives and particularly those compounds have a labile ester substituent are especially valuable derivatives. By the term "labile ester" as used herein is meant a group which is readily hydrolyzed biologically, for example by enzymes in the body fluids of animals including man, to produce the free acid or a salt thereof which is more active as an antibiotic agent. The amide or substituted amide groups present in the amide-ester derivatives are also readily hydrolyzed biologically in the body fluids and hence the amide-labile ester derivatives are useful in antibiotic therapy.

The esters which are sufficiently labile for use as antibiotic agents are readily determined experimentally, for example by incubation with body fluids, to ascertain whether or not under such conditions the ester group is cleaved. Alternatively, other methods, including chemical tests, can be utilized to determine if particular ester groups are sufficiently labile. Thus, the esters which give demonstrable antibiotic activity after heating in an aqueous medium at 37°C. for 2 hours at pH 2.2 or in an aqueous medium at pH 9 for 80 hours can be considered to be labile esters. Suitable labile ester groups that might be mentioned are ethers of the formula —$CH_2OR$, a phenacyloxymethyl group, acyloxy methyl groups of the formula —$CH_2OA$ wherein A is an acyl group comprising an organic radical derived from an organic acid by the removal of the hydroxy group, amide and substituted amide derivatives of such acyloxy methyl substituents, acylaminomethyl groups of the formula —$CH_2NHA$ wherein A is the same as defined above, thiomethyl ethers of the formula —$CH_2SR$, an ethynyloxy group of the formula —$CH_2OC \equiv CH$, substituted ethynyloxy groups of the formula —$CH_2OC \equiv CR$, a vinyloxymethyl group of the formula —$CH_2OCH=CH_2$, substituted vinyloxymethyl groups of the formulas —$CH_2OCH=CHR$ or —$CH_2OCH=CRR$, or a nitro oxy group of the formula —$CH_2ONO_2$. R in each of the foregoing formulas is a hydrocarbyl group or substituted hydrocarbyl group defined above.

Specific examples of such labile ester groups that might be mentioned are methoxymethyl, tetrahydropyranyloxomethyl, phenacyloxymethyl, acetoxymethyl, butyryloxymethyl, isobutyryloxymethyl, pivaloyloxymethyl, benzoyloxymethyl, 2-methylbenzoyloxymethyl, 2,6-dimethylbenzoyloxymethyl, 2-methyl-6-chlorobenzoyloxymethyl, 3-trifluoromethylbenzoyloxymethyl, 2-nitrobenzoyloxymethyl, 2-methylthiobenzoyloxymethyl, 2-thienylcarbonyloxymethyl, 2-furylcarbonyloxymethyl, 3-pyridylcarbonyloxymethyl, pyrazinylcarbonyloxymethyl, 2-methylcyclopentylcarbonyloxymethyl, 1-adamantylcarbonyloxymethyl, phenylsulfonylmethyl, phosphonooxymethyl, diethylphosphonoxymethyl, carbethoxyoxymethyl, carbamoyloxymethyl, N-methylcarbamoyloxymethyl, N,N-dimethylcarbamoyloxymethyl, phenylsulfamoyloxymethyl, acetaminomethyl, benzoylaminomethyl, methylthiomethyl, phenylthiomethyl, vinyloxymethyl, 1-methylvinyloxymethyl, and nitrooxymethyl.

The following examples illustrate embodiments of our invention.

EXAMPLE 1

Effect of Combining Glycerol or DL-α-Glycerophosphate with Phosphonomycin on its Inhibition of

Several Strains of Bacteria

Overnight cultures of the indicated strains in Nutrient Broth (Difco) were diluted one hundred fold, and an aliquot of 0.05 ml. was swabbed over the surface of a 2mm deep layer of the indicated solid growth media in 50cm² petri dishes. Sensitivity discs, consisting of a 7mm diameter filter paper circle containing either 5 or 30 μg of phosphonomycin with an additional amount of glycerol or disodium DL-α-glycerophosphate were placed on the surface of the seeded agar. Zones of inhibition were measured after 18 hours of incubation at 37°C. The results are shown in the following table:

| Strain | Medium | μg P | Zone Size mm Diameter | | | | |
|---|---|---|---|---|---|---|---|
| | | | P | A | B | C | D |
| E. coli MB 2489 | Nutrient Agar | 5 | 11 | 45 | 40 | 10 | 0 |
| E. coli MB 2498 | Nutrient Agar | 30 | 13 | 13 | 12 | 13 | 0 |
| E. coli MB 2489 A2 | Nutrient Agar | 5 | 8 | 47 | 43 | 10 | 0 |
| E. coli MB 2017 | Nutrient Agar | 5 | 12 | 29 | 26 | 16 | 0 |
| Pseudo. aeruginosa T 9 | Nutrient Agar | 5 | 15 | 40 | 18 | 15 | 0 |
| Pseudo. aeruginosa T 19 | Nutrient Agar | 30 | 18 | 31 | 29 | 16 | 0 |
| Pr. mirabilis T 10 | Mueller Hinton Agar | 5 | 21 | 25 | 23 | 23 | 23 |
| D. pneumoniae I 37 | Nutrient Agar + 10 % Horse serum | 30 | 10 | 15 | — | 16 | — |
| D. pneumoniae I 37 | Brain Heart Infusion + 10% Horse serum | 30 | 12 | 14 | — | 15 | — |
| D. pneumoniae I 2483 | Brain Heart Infusion + 10% Horse serum | 30 | 10 | 13 | — | 14 | — |
| Strep. pyogenes 3009 | Brain Heart Infusion + 10% Horse serum | 30 | 15 | 19 | — | 18 | 0 |
| Strep. pyogenes 1685 | Brain Heart Infusion + 10% Horse serum | 30 | 14 | 17 | — | 13 | 0 |
| Sal. schottmuelleri 1814 | Brain Heart Infusion | 30 | 11 | 19 | — | 12 | — |
| Sal. typhimurium MB 1995 | Brain Heart Infusion | 30 | 15 | 19 | — | 15 | — |
| Sal. typhosa. 2866 | Brain Heart Infusion | 30 | 19 | 22 | — | 19 | — |

Key to identity and amount of potentiator added to disc in combination with phosphonomycin;
- P — Phosphonomycin (disodium salt) (amount indicated in the column to the left)
- A — Glycerol, 10 mg.
- B — Glycerol, 1 mg.
- C — DL-α-glycerophosphate, disodium, 10 μg.
- D — DL-α-glycerophosphate, disodium, 100 μg.

Glycerol is seen to synergise a broad spectrum of strains, failing only in the case of E. coli 2498 (a mutant derivative of MB 2489) which is known to lack α-glycerophosphate transport activity, and Proteus mirabilis(T 10). The latter strain, in common with all sensitive Proteus species examined, has a very active α-glycerophosphate transport system, which is in all probability constitutive, i.e., not subject to further induction.

Few significant examples of enhanced sensitivity are observed at the low level of added disodium DL-α-glycerophosphate, even though it is a known inducer of the transport system at least in MB 2489. Rather, antagonism is demonstrable at the high level (100 μg) added to the disc. This phenomenon probably represents the expected competition between phosphonomycin and α-glycerophosphate for their common transport system. In contrast, glycerol, while an inducer, is not a substrate, and therefore does not preoccupy the transport system whose activity it has stimulated.

EXAMPLE 2

The Effect of Glucose-6-Phosphate on the Sensitivity of Escherichia coli and Staphylococcus aureus to Phosphonomycin in Liquid Media of Various Composition Overnight broth cultures were diluted 1:10,000 ($10^5$ cells/ml) in the indicated media and combined with an equal volume of media containing various levels of disodium phosphonomycin. The minimal inhibitor concentration (M.I.C.) was that final concentration of phosphonomycin below which turbidity was observed following a 24 hour incubation at 35°C.

| Medium | M.I.C. μg/ml Staphylococcus aureus MB 2949 | Phosphonomycin Escherichia coli MB 2017 |
|---|---|---|
| Mueller Hinton Broth (Difco) | 50 | 3.12 |
| Mueller Hinton Broth plus disodium glucose-6-phosphate, 25 μg/ml | 3.12 | 0.78 |
| Nutrient Broth (Difco) | 25 | 12.5 |
| Nutrient Broth (Difco) plus disodium glucose-6-phosphate | 1.5 | 0.39 |
| Nutrient Broth (Difco) plus 5% v/v Defibrinated Sheep Blood (Gibco) | 3.12 | 0.39 |

With both media, glucose-6-phosphate is observed to potentiate by a factor of 4 to 40 the sensitivity of Gram-positive and Gram-negative pathogens. In Nutrient Broth, the effect observed with glucose-6-phosphate mimics that observed with sheep blood.

EXAMPLE 3

The Influence of Glucose-6-Phosphate on the Fraction of Bacterial Populations that Survive a Given Level of Phosphonomycin Various solutions of overnight broth cultures of the indicated bacterial strains were swabbed over the surface of petri dishes containing Mueller Hinton medium, 1.5 percent Agar (Difco), and supplemented with the indicated levels of disodium phosphonomycin, with or without 25 μg/ml of disodium glucose-6-phosphate. From the number of colonies present at a particular dilution of input organisms, the number of input cells surviving a given level of phosphonomycin with and without glucose-6-phosphate are calculated and shown in the following table:

| Strain | μg/ml Phosphonomycin | Number of surviving colony formers per ml | |
|---|---|---|---|
| | | Mueller Hinton Agar alone | Mueller Hinton Agar plus 25 μg/ml glucose-6-phosphate |
| Escherichia coli MB 2017 | 0 | $3\times10^9$ | $3\times10^9$ |
| | 10 | $3\times10^5$ | $5\times10^2$ |
| | 30 | $3\times10^5$ | 50 |
| | 100 | $3\times10^5$ | <10 |
| Staphylococcus aureus MB 2949 | 0 | $3\times10^9$ | $3\times10^9$ |
| | 10 | $3\times10^5$ | $3\times10^5$ |
| | 30 | $3\times10^5$ | <100 |
| | 100 | $3\times10^3$ | <10 |
| Aerobacter aerogenes MB 3287 | 0 | $7\times10^8$ | $5\times10^8$ |
| | 10 | $3\times10^7$ | $1\times10^5$ |
| | 30 | $5\times10^5$ | $5\times10^4$ |
| Staphylococcus aureus MB 3036 | 0 | $2\times10^8$ | $2\times10^8$ |
| | 10 | $2\times10^5$ | $1\times10^3$ |
| | 30 | $2\times10^4$ | $1\times10^3$ |
| | 100 | <10 | <10 |
| Shigella sp. MB 3298 | 0 | $2\times10^8$ | $2\times10^8$ |
| | 10 | $3\times10^7$ | $1\times10^3$ |
| | 30 | $3\times10^7$ | $1\times10^3$ |
| | 100 | $1\times10^4$ | $6\times10^2$ |

In all cases, a smaller proportion of the input bacterial population survives to form colonies on the plate containing glucose-6-phosphate, than on the plate that lacks this potentiation. In most cases, the substantial residual population (of the order of 1 in $10^3$ to 1 in $10^4$) that survive high levels of phosphonomycin, are eradicated or much reduced when glucose-6-phosphate is also present. Thus a sensitization of the bulk population and an elimination of resisters are evident when this inducer is present.

EXAMPLE 4

Effect of Glucose-6-Phosphate on the Size of the Zone of Inhibition Surrounding Sensitivity Discs Containing this Sugar Phosphate in Combination with Phosphonomycin Overnight cultures of the indicated strains grown in Nutrient Broth (Difco) were diluted one hundred fold, and an aliquot of 0.05 ml was swabbed over the surface of a petri dish containing 10 ml of Mueller Hinton Agar (Difco). Sensitivity discs, consisting of a 7 mm diameter filter paper disc containing either 5 or 30 μg of disodium phosphonomycin with or without an additional 5 μg of disodium glucose-6-phosphate, were placed on the surface of the seeded agar. Zones of inhibition were measured after 18 hours of incubation at 37°C.

| Bacterial strain | Diameter of Zone of Inhibition mm | | | |
|---|---|---|---|---|
| | 5 μg — 30 μg Phosphonomycin without glucose-6-phosphate | | 5 μg — 30 μg Phosphonomycin plus glucose-6-phosphate | |
| Escherichia coli MB 2017 | 11 | 16 | 20 | 24 |
| Staphylococcus aureus MB 2949 | 0 | 11 | 13 | 20 |
| Aerobacter aerogenes MB 3287 | 0 | 0 | 16 | 26 |
| Staphylococcus aureus MB 3036 | 0 | 30 | 27 | 40 |
| Shigella sp. MB 3298 | 0 | 10 | 24 | 37 |

The sensitization of cells by glucose-6-phosphate noted in the prior example is here made evident by substantial increases in the zone of inhibition surrounding discs that contain a mixture of phosphonomycin and glucose-6-phosphate. It is further noteworthy that in all cases where zone enhancement is observed in the presence of glucose-6-phosphate, the inhibited area is found to be relatively free of the myriad of drug resistant colonies that surround a disc of phosphonomycin by itself. These observations are consistent with the induction by glucose-6-phosphate of an alternate pathway for the entry of phosphonomycin into cells that have lost their normally expressed α-glycerophosphate transport pathway.

EXAMPLE 5

Example of a Method for Screening Phosphate Esters as Inducers of Latent Transport Systems of Phosphonomycin in *Escherichia coli*

The strain of *Escherichia coli* MB 2498 is a subculture of mutant 6 described in Table 1 of the Journal of Molecular Biology, 31, 371 (1968). It lacks the ability to grow on or accumulate L-α-glycerophosphate, and is resistant to levels of phosphonomycin up to 70 μg/ml in Nutrient Broth. (The parent wild type strain is completely inhibited by 10 μg/ml of disodium phosphonomycin.) MB 2498 also is lacking in alkaline phosphatase activity, and therefore degrades exogenous phosphate esters to a minimum extent.

In a search for inducers of additional transport systems for phosphonomycin, 0.05 ml of a $10^7$ cell/ml suspension was smeared over the surface of a 50 cm² petri plate containing 10 ml Nutrient Broth, 1.5 percent Agar (Difco), and 25 μg/ml of disodium phosphonomycin. Paper discs measuring 7 mm in diameter and capable of absorbing 0.25 ml of solvent were treated with solutions of various phosphate esters and applied to the agar surface. Zones of inhibition were measured after 18 hours incubation at 37°C.

| Compound tested | μg present in disc | Zone of inhibition mm diameter |
|---|---|---|
| None | — | 0 |
| Glucose-6-phosphate disodium | 1.0 | 31 |
| | 0.5 | 27 |
| | 0.1 | 18 |
| Fructose-6-phosphate disodium | 10.0 | 42 |
| Mannose-6-phosphate disodium | 6.0 | 31 |
| 2-deoxy-glucose-6-phosphate disodium | 1.0 | 27 |
| 2-amino-2-deoxy-glucose-6-phosphate disodium | 25.0 | 34 |
| Ribose-5-phosphate disodium, monohydrate | 25 | 35 |
| Phosphatidyl ethanolamine | 30 | 29 |
| Glucose-1',6'-diphosphate, tetra-potassium pentahydrate | 25 | 34 |
| Glucose-1-phosphate disodium | 25 | 31 |
| 5-phosphoryl ribose-1-pyrophosphate, dimagnesium dihydrate | 25 | 25 |
| Riboflavin-5-phosphate disodium | 25 | 14 |

Among the compounds in the above test showing no activity at a level of 25 μg per disc were: inositolphosphate, adenosine-5'-phosphate, galactose-1-phosphate, 2'deoxy ribose-1'-phosphate, α-D-ribose-1-phosphate, β-D-ribose-1-phosphate, α-D-xylopyranose-1-phosphate, gluconic-6-phosphate, mannose-1-phosphate, erythrose-4-phosphate, pyridoxine-phosphate, thiamine monophosphate, D-galactose-6-phosphate, D-fructose-1-phosphate, fructose-1-6-diphosphate, phosphoserine, phosphatidyl choline, N,N-dimethyl-L-phosphatidyl ethanolamine, as well as an extensive list of non-phosphorylated tetroses, pentoses, and hexoses. Thus the potentiation phenomenon shows a degree of specificity, which in the case of the hexose phosphates seems to include primarily those compounds that are generated by the hexokinases and includes those hexose phosphates known to induce the glucose-6-phosphate transport system (Compounds 1, 2, 3, 4, and 9).

None of the potentiating compounds at the levels tested produced zones of inhibition with MB 2498 seeded plates consisting of Nutrient Broth/Agar lacking phosphonomycin.

EXAMPLE 6

Effect of Combining Various Phosphate Esters on the Inhibition of Several Strains of Bacteria Overnight cultures of the indicated strains in Nutrient Broth (Difco) were diluted one hundred fold, and an aliquot of 0.05 ml was swabbed over the surface of a 2 mm deep layer of the indicated solid growth media. Sensitivity discs, consisting of a 7 mm diameter filter paper circular disc containing either 5 or 30 μg of disodium phosphonomycin with an additional amount of the indicated phosphate esters, were placed on the surface of the seeded agar. Zones of inhibition were measured after 18 hours of incubation at 37°C.

| Strain | P μg | Zone size mm diameter (see key below for phosphate ester added) | | | | | | | | |
|---|---|---|---|---|---|---|---|---|---|---|
| | | P | A | B | C | D | E | F | G | H | I |
| MB 2489 | 5 | 11 | 25 | 25 | 20 | 30 | 22 | 21 | 18 | 15 | 22 |
| MB 2489 A2 | 5 | 8 | 10 | 10 | 10 | 10 | 21 | 10 | 11 | 10 | 10 |
| MB 2498 | 30 | 13 | 33 | 33 | 26 | 24 | 21 | 31 | 26 | 21 | 30 |
| MB 24980 | 30 | 11 | 12 | 10 | 10 | 12 | 14 | 10 | 11 | 11 | 12 |
| MB 2017 | 5 | 12 | 23 | 22 | 20 | 17 | 16 | 21 | 19 | 17 | 19 |
| T 14 | 5 | 0 | 13 | 15 | 0 | 0 | 0 | 12 | 0 | 0 | 0 |
| T 27 | 30 | 0 | 20 | 20 | 0 | 0 | 01 | 18 | 13 | 0 | 14 |
| T 9 | 5 | 15 | 16 | 15 | 15 | 15 | 12 | 15 | 16 | 16 | 16 |
| T 10 | 5 | 21 | 23 | 23 | 23 | 23 | 22 | 22 | 22 | 23 | 23 |
| T 19 | 30 | 18 | 17 | 17 | 17 | 15 | 18 | 15 | 17 | 17 | 15 |

Key to the identity and amount of phosphate esters added to disc together with phosphonomycin P — Phosphonomycin disodium salt (amount indicated for the column to the left)
A — glucose-6-phosphate 5 µg
B — 2'-deoxy-glucose-6-phosphate 5 µg
C — ribose-5-phosphate 25 µg
D — phosphatidyl ethanolamine 25 µg
E — riboflavin-5-phosphate 50 µg
F — fructose-6-phosphate 5 µg
G — mannose-6-phosphate 5 µg
H — 2-amino-2-deoxy-glucose-6-phosphate 25 µg
I — glucose-1-phosphate 25 µg Strain MB 2489 is an *Escherichia coli* that grows well on α-glycerophosphate and D-glucose-6-phosphate. It exhibits on Nutrient Broth Agar moderate sensitivity to phosphonomycin that is much enhanced by the whole series of hexose-phosphate esters (A,B,F,G,I) known to induce the glucose-6-phosphate transport pathway.

Strain MB 2498 A2 was isolated from the periphery of the enhanced zone of inhibition surrounding a disc bearing phosphonomycin (5 µg) and glucose-6-phosphate (25µg). It was found to grow well on α-glycerophosphate, but to show no stimulation of growth by glucose-6-phosphate. Although this strain is as sensitive to phosphonomycin alone as is the parent MB 2489 (as expected, since its α-glycerophosphate transport system is active), it fails to be stimulated on Nutrient Broth Agar by any of the hexose phosphate inducers of the glucose-6-phosphate transport system. In addition, the failure of ribose-5-phosphate and phosphatidyl ethanolamine to synergise suggests that these esters also induce the glucose-6-phosphate transport system. However, the activity still exhibited by riboflavin-5-phosphate implies the presence of yet a third inducible pathway that mediates enhanced phosphonomycin transport.

Strain MB 2498 is a mutant of MB 2489 that lacks the α-glycerophosphate pathway (i.e., it fails to grow on α-glycerophosphate but retains the glucose-6-phosphate inducible system). Although it is much less sensitive on Nutrient Broth Agar to phosphonomycin as such than MB 2489, it retains the ability to be stimulated by the phosphate ester inducers.

Strain MB 24980 was isolated as a resistant colony from a plate containing 25 µg/ml of phosphonomycin and 25 µg/ml of glucose-6-phosphate. In keeping with the above results, its sensitivity on Nutrient Broth Agar to phosphonomycin is enhanced solely by riboflavin-5-phosphate.

Strain MB 2017 is an *Escherichia coli* pathogenic for mice. It exhibits broad sensitization on Nutrient Broth Agar by the entire class of phosphate ester inducers.

Strain T 14 is a *Klebsiella* species isolated from the urine of a patient just about to receive phosphonomycin therapy; T 27 is a *Klebsiella* species isolated from the urine of a patient who had been on phosphonomycin oral therapy for seven days. Both of the strains are resistant on Nutrient Broth Agar to phosphonomycin by itself, but show moderate sensitivity in the presence of a variety of inducers of the glucose-6-phosphate pathway.

Strains T 9 and T 19 are strains of *Pseudomonas aeruginosa* isolated from the urine of infected humans. They show no significant response on Nutrient Broth Agar to the above phosphate esters.

Strain T 10 is a *Proteus mirabilis* strain isolated from the urine of an infected human, and shows no significant response on Mueller Hinton Agar to any of the above phosphate esters.

EXAMPLE 7

The Effect seen in Various Growth Media of Glucose-6-Phosphate on the Size of the Zone of Inhibition Surrounding Sensitivity Discs Containing this Sugar Phosphate in Combination with Phosphonomycin An overnight culture of *Escherichia coli*, MB 2489, grown in Nutrient Broth was diluted one hundred fold, and an aliquot of 0.05 ml was swabbed over the surface of a 2 mm deep agar medium consisting of either Nutrient Broth, 1.5 percent Agar (Difco), Brain Heart Infusion, 1.5 percent Agar (Difco), Mueller Hinton Agar (Difco), Trypticase-Soy Agar (BBL), or a "human urine-agar." The latter medium was prepared by centrifuging adult male urine collected immediately after sleep, membrane filtering the supernatant to achieve sterility and combining the filtrate with one tenth volume of autoclaved 15 percent Noble Agar (Difco) in water to produce a solid medium. Sensitivity discs, consisting of a 7mm diameter filter paper disc containing either 5 or 30 µg of disodium phosphonomycin with and without disodium glucose-6-phosphate, were placed on the surface of the seeded agar. Zones of inhibition were measured after 18 hours of incubation at 37°C.

| Medium used | Diameter of Zone of Inhibition — mm | | | |
|---|---|---|---|---|
| | 5 µg | 30 µg | 5 µg | 30 µg |
| | Phosphonomycin alone | | Phosphonomycin plus glucose-6-phosphate (25 µg) | |
| Nutrient Broth | 12 | 24 | 28 | 33 |
| Mueller Hinton Broth | 0 | 14 | 20 | 26 |
| Brain Heart Infusion | 0 | 12 | 16 | 20 |
| Trypticase-Soy Broth | 0 | 15 | 18 | 24 |
| Human urine | 9 | 19 | 14 | 26 |

The activity of phosphonomycin alone is clearly antagonized relative to Nutrient Broth in the other media employed. This antagonism can be attributed to a major extent to high levels of sodium chloride in Mueller Hinton, glucose and phosphate in Brain Heart Infusion and Trypticase-Soy and phosphate ion in human urine. These interfering phenomena are substantially overcome by the inclusion of glucose-6-phosphate in the sensitivity disc.

EXAMPLE 8

Effect of Glucose-6-Phosphate on the Sensitivity of *Escherichia Coli* Strains to Several Phosphonomycin Analogues Overnight cultures of *Escherichia coli*, strains MB 2489 (possessing both the α-glycerophosphate transport and the glucose-6-phosphate transport systems) and MB 2498 (possessing only the glucose-6-phosphate pathway, and therefore relatively resistant to phosphonomycin alone) were diluted one hundred fold and an aliquot of 0.05 ml was swabbed over the surface of a 2 mm of Nutrient Broth, 1.5 percent agar (Difco). Sensitivity discs consisting of a 7 mm diameter paper disc containing disodium phosphonomycin or one of the indicated analogues in the stated quantities together with an additional 5 μg of disodium glucose-6-phosphate where indicated, were placed on the surface of the seeded agar. Zones of inhibition were measured after 18 hours of incubation at 37°C.

| Active substance | amount μg | MB 2489 no G-6-P | MB 2489 +G-6-P | MB 2498 no G-6-P | MB 2498 +G-6-P |
|---|---|---|---|---|---|
| Phosphonomycin | 5 | 14 | 28 | 0 | 30 |
|  | 2.5 | 12 | 25 | 0 | 24 |
|  | 1.0 | 0 | 20 | 0 | 24 |
|  | 0.3 | 0 | 18 | 0 | 15 |
| 1-methyl-1,2 epoxyethyl phosphonic acid, mono dicyclohexyl amine salts | 500 | 20 | 38 | 9 | 42 |
|  | 50 | 0 | 32 | 0 | 36 |
|  | 5 | 0 | 13 | 0 | 16 |
| 1,2 epoxyethyl phosphonic acid, dicyclohexyl ammonium salt | 500 | 16 | 35 | 8 | 38 |
|  | 50 | 0 | 26 | 0 | 29 |
|  | 5 | 0 | 10 | 0 | 12 |

Glucose-6-phosphate is observed to so potentiate the sensitivity of phosphonomycin-sensitive and resistant strains that they now respond to weak analogues of phosphonomycin to the same degree as to phosphonomycin by itself.

EXAMPLE 9

Effect of Phosphonomycin and Glucose-6-Phosphate and Combinations thereof in Treatment of Infected Mice Female C.D.1 mice of average weight, 22.5 g., were infected intraperitoneally with 16-hour broth cultures appropriately diluted in brain heart infusion. For *E. coli* the challenge contained $2.5 \times 10^7$ cells or 7 $LD_{50}$ doses; for *Shigella*, $2.3 \times 10^8$ cells or 3 $LD_{50}$ doses. At the time of infection the disodium salt of phosphonomycin and sodium glucose-6-phosphate was administered separately in 0.25 ml. subcutaneously at a separate site, one on each side of the dorsal surface. The results of these tests are shown in the following table:

| Test Organism | $ED_{50}$ subcutaneously G-6-P μg | Disodium phosphonomycin (DSP) μg | Disodium phosphonomycin (DSP) % | DSP + 1.0mg G-6-P μg | DSP + 1.0mg G-6-P % | DSP + 0.1mg G-6-P μg | DSP + 0.1mg G-6-P % |
|---|---|---|---|---|---|---|---|
| Escherichia coli 2017 | >4000 | 155 | 100 | 12 | 8 | 91 | 58 |
| Shigella (118–57) 3303 | >4000 | 1000 | 100 | 82 | 8 | 1500 | 150 |

EXAMPLE 10

Effect of Phosphonomycin and Glucose-6-Phosphate, and Combinations thereof in the Treatment of Infected Mice In further mouse tests carried out as described in Example 1 except that the antibiotic was combined with the sodium glucose-6-phosphate and given in one injection, the following results were obtained in mice infected with *Aerobacter aerogenes* and *Staphylococcus aureus*:

| $ED_{50}$ in μg Test Organism | Disodium phosphonomycin (DSP) s.c. DSP Alone | μg G-6-P added to DSP 4000 | μg G-6-P added to DSP 1000 | μg G-6-P added to DSP 500 | μg G-6-P added to DSP 100 | G-6-P $ED_{50}$ used alone (μg) |
|---|---|---|---|---|---|---|
| Aerobacter aerogenes 3148 | 10,000+ | 287 | 3,000 | 7,700 | 10,000 | >4,000 |
| Staphylococcus aureus Smith 2949 | 96 | 22 | 50 |  |  | >4,000 |

EXAMPLE 11

Effect of Fructose-6-Phosphate in Potentiating Phosphonomycin in Mice

The efficacy of fructose-6-phosphate in potentiating the control by phosphonomycin of experimental bacterial infections in mice was compared with that of glucose-6-phosphate in tests following the protocol of Example 10. Again the antibiotic was combined with the sugar phosphate in a single subcutaneous injection administered at the time of intraperitoneal inoculation with *Escherichia coli*, MB 2017.

| Potentiator | Dose (μg) | $ED_{50}$, μg Phosphonomycin |
|---|---|---|
| None | — | 2000 |
| Glucose-6-phosphate disodium | 1000 | 17 |
|  | 600 | 31 |
|  | 300 | 69 |
|  | 100 | 470 |
| Fructose-6-phosphate disodium | 1000 | 17 |
|  | 600 | 57 |
|  | 300 | 202 |
|  | 100 | 534 |

Fructose-6-phosphate is seen to exercise a degree of potentiation toward phosphonomycin that is comparable with that observed previously in the parallel experiment with glucose-6-phosphate. This equivalency was expected both from the similar enhancement of inhibition observed in vitro, in Example 5, when either of these sugar phosphates were combined with phosphonomycin, and from the certainty of their interconversion by the ample phosphoglucose-isomerase activity present in plasma.

EXAMPLE 12

Therapeutic Efficacy of Phosphonomycin Administered Orally to Infected Mice Receiving Glucose-6-

Phosphate by Either the Oral or Subcutaneous Route

The protocol of Example 9 was followed for the case of *Escherichia coli* 2017 except that immediately upon infection the disodium salt of phosphonomycin was administered orally, while disodium glucose-6-phosphate, where indicated, was administered either orally or by the subcutaneous route. In no case was protection observed when glucose-6-phosphate was administered alone at the 4,000 μg level, orally or subcutaneously, in the absence of phosphonomycin.

| Glucose-6-phosphate μg | Route | Dose of phosphonomycin (μg) administered orally that protects 50% of animals ($ED_{50}$) |
|---|---|---|
| 0 | — | 2000 |
| 1000 | orally | 2000 |
| 100 | subcutaneous | 37 |

Glucose-6-phosphate is an effective potentiator of therapy for phosphonomycin administered orally (25 fold sensitization) when sugar phosphate is administered subcutaneously. No sensitization is observed when the sugar phosphate is administered orally at that level.

EXAMPLE 13

Therapeutic Efficacy of Phosphonomycin Administered Parenterally to Infected Mice Receiving Glucose-6-Phosphate Salts Orally The protocol of Example 9 was followed for the case of *Escherichia coli* 2017 except that immediately after infection the disodium salt of phosphonomycin was administered subcutaneously, while glucose-6-phosphate in the indicated form was administered orally by gavage in 0.25 ml. of water. In no case was protection observed with the glucose-6-phosphate salts administered alone, nor did the oral administration solely of 2.5 mg. of n-octylammonium chloride (without glucose-6-phosphate) decrease the $ED_{50}$ of phosphonomycin coadministered parenterally. The n-octylammonium salts of glucose-6-phosphate were prepared by converting its disodium salt to the free acid by passage through a column containing a 20-fold excess of Dowex-50 ($H^+$ form), followed by neutralization of portions of the eluate with either 0.7, 1.5, or 2.0 molar equivalents of the free n-octylamine base, and 1.3, 0.5, or 0 molar equivalents of NaOH respectively, to give a final pH of 7.5 in each case.

| Glucose-6-phosphate salt (mg) | Dose of phosphonomycin that protects 50% of animals ($ED_{50}$) (μg) |
|---|---|
| TEST I | |
| none | 500 |
| disodium salt 100 | 27 |
| 50 | 63 |
| 25 | 125 |
| 12.5 | 302 |
| 6.25 | 531 |
| sodium 0.5 + n-octylammonium 1.5  10 | 66 |
| 1 | 302 |
| TEST II | |
| none | 827 |
| di-n-octyl-ammonium  5 | 125 |
| sodium 0.5 n-octyl-ammonium 1.5  5 | 168 |
| sodium 1.3 n-octyl-ammonium 0.7  5 | 714 |

Glucose-6-phosphate administered orally potentiates therapy by phosphonomycin, and is rendered more efficient in this effect in proportion to the fraction of inorganic counterion replaced by lipophilic amine.

EXAMPLE 14

Potentiation by Coadministered Galactose-6-phosphate of Phosphonomycin Therapy in Mice Infected with *Staphylococci*

An examination of the efficacy of galactose-6-phosphate in potentiating the control by phosphonomycin of experimental *Staphylococcal* infections in mice was justified by the finding, made in an application to this strain of the methodology described in Example 6, that 25 μg of this sugar phosphate when added to a sensitivity disc bearing 5 μg of phosphonomycin produced a 21 mm zone of inhibition as opposed to a 17 mm zone for the unsupplemented disc, when the discs were placed on a Nutrient Agar plate seeded with *Staphylococcus aureus* Smith 2949. In the therapy trial below, the antibiotic was combined with the sugar phosphate in a single subcutaneous injection administered at the time of intraperitoneal injection with $10^6$ cells per mouse (14 $LD_{50}$'s), with cells grown for 16 hours in brain-heart infusion.

| Potentiator | Dose (μg) | $ED_{50}$ (μg Phosphonomycin) |
|---|---|---|
| none | — | 212 |
| disodium glucose-6-phosphate | 4000 | 91 |
| disodium galactose-6-phosphate | 4000 | 25 |

The effectiveness of galactose-6-phosphate as a potentiator is explained by the demonstrated existence in *Staphylococcus* of an inducible galactose-6-phosphate transport system. Galactose-6-phosphate is a metabolite of lactose hydrolysis unique to certain Gram-positive organisms, not however generated or utilized by *E. coli*. This accounts for the failure of galactose-6-phosphate to potentiate phosphonomycin action on *E. coli* (Example 5).

EXAMPLE 15

Effect of Mannose-6-phosphate in Potentiating Phosphonomycin in Mice

The efficacy of mannose-6-phosphate in potentiating the control by phosphonomycin of experimental infections in mice was compared with that of glucose-6-phosphate, in tests following the protocol of Example 10. Again the antibiotic was titrated in combination with a series of fixed levels of sugar phosphates in a single subcutaneous injection administered at the time of intraperitoneal inoculation with *Escherichia coli* MB 2017.

| Potentiator | Dose ($\mu$g) | ED$_{50}$ ($\mu$g Phosphonomycin) |
|---|---|---|
| none | — | 1420 |
| disodium glucose-6-phosphate | 1000 | 18 |
| disodium mannose-6-phosphate | 1000 | 19 |
| do. | 500 | 23 |
| do. | 250 | 92 |
| do. | 125 | 490 |

Mannose-6-phosphate exercises a degree of potentiation toward phosphonomycin equivalent to that of comparable levels of glucose-6-phosphate, even though its effect in vitro is only one-tenth that of glucose-6-phosphate. This discrepancy can be attributed to the conversion of mannose-6-phosphate to glucose-6-phosphate in vivo by sequential action of mannose-phosphate-isomerase and phosphoglucose isomerase, enzymes whose activities are demonstrable in plasma and in the walls of blood vessels.

EXAMPLE 16

Potentiation by Glucose-1-phosphate and Ribose-5-phosphate of Phosphonomycin Therapy in Mice The efficacy of glucose-1-phosphate and ribose-5-phosphate in potentiating the control by phosphonomycin of experimental bacterial infections in mice was compared with that of glucose-6-phosphate in tests following the protocol of Example 10. Again the antibiotic was titrated for its curative efficacy in combination with the indicated fixed levels of sugar phosphate in a single injection administered at the time of intraperitoneal inoculation with *E. coli* MB 2017.

| Potentiator | Dose ($\mu$g) | ED$_{50}$ ($\mu$g Phosphonomycin) |
|---|---|---|
| none | — | 940 |
| disodium glucose-6-phosphate | 1000 | 5 |
| dipotassium glucose-1-phosphate | 1000 | 9 |
| disodium ribose-5-phosphate* | 1000 | 158 |

*This sample was demonstrated by a specific assay with glucose-6-phosphate dehydrogenase to be contaminated by no more than one part per thousand of glucose-6-phosphate.

The potentiating ability of 1,000 $\mu$g of ribose-5-phosphate, while significant, is equivalent only to that produced by approximately 100 $\mu$g of glucose-6-phosphate (see Example 11). This degree of relative potency was anticipated from the ratio of the weights of ribose-5-phosphate to glucose-6-phosphate which produce equivalently enhanced zones of inhibition in vitro (Example 5). The equivalent potencies of glucose-1-phosphate and glucose-6-phosphate in vivo, despite differences in vitro, is most likely attributable to rapid conversion of the 1-phosphate to the 6-phosphate by the action of phosphoglucomutase, known to be present in plasma.

EXAMPLE 17

Potentiation by Coadministered Lactose of Phosphonomycin Therapy in Mice Infected with Streptococci On applying the methodology described in Example 6 to the Streptococci, we found that 250 $\mu$g of lactose added to a sensitivity disc bearing 30 $\mu$g of phosphonomycin produced a 27 mm diameter zone of inhibition, as compared with a 12 mm zone with an unsupplemented disc, when the discs were placed on a Nutrient Agar plate seeded with *Streptococcus faecalis* R. In the therapy trials below, 14 colony-forming units (7 LD$_{50}$'s) of the pathogenic *Streptococcus pyogenes* (1934) grown in brain-heart broth supplemented with 10 percent horse serum, were inoculated intraperitoneally. Simultaneously 0.5 ml of either a lactose solution or a saline control were injected subcutaneously followed in Trial I by a single 0.5 ml dose of phosphonomycin orally (by gavage), and in Trial II by 4 successive 0.5 ml oral doses of antibiotic at 0, 2, 4, and 6 hours post infection.

| Potentiator | Dose (mg) | ED$_{50}$ (total phosphonomycin administered — $\mu$g) |
|---|---|---|
| Trial I | | |
| none | — | 3,950 |
| lactose | 4 | 1,530 |
| Trial II | | |
| none | — | 2,100 |
| lactose | 4 | 800 |

Neutral saccharides are thus capable of potentiating phosphonomycin action in vivo as in vitro. Certain Streptococci, in common with Staphylococci, also show inducible metabolism of lactose to galactose-6-phosphate.

EXAMPLE 18

Efficacy of Phosphonomycin in Protecting Mice Infected by Mutant Bacterial Isolates Displaying High Levels of the L-$\alpha$-Glycerophosphate Transport System In the Absence of Inducer Mutants were isolated from *E. coli* 2017 employing a mutagenesis and mutant detection screen described in Biochimica et Biophysica Acta, Volume 60, p. 422–424, 1962, and these mutants showed high levels of $\alpha$-glycerophosphate and glycerol metabolism without the need for prior growth in the presence of these inducers, such as is shown by the natural strains. The diameter of the zones of inhibition around sensitivity discs bearing 5 $\mu$g of phosphonomycin, placed on Nutrient Agar plates seeded with mutants C$_1$, C$_2$, and the parent strain, were 20, 24, and 12 mm respectively. Since we have shown (Example I), that the addition of glycerol to such discs on the parent strain increases the zone size to 26–29 mm, we conclude that the mutant strains possess levels of the phosphonomycin transport system (i.e., the L-$\alpha$-Glycerophosphate transport system) comparable to those of induced wild type strains. Therefore, the response of these mutants to phosphonomycin therapy should be predictive of the response of induced wild type strains in other situations. Mutants C$_1$ and C$_2$ and the parent strain were grown under identical conditions (described in Example 9) and were inoculated intraperitoneally into mice at the indicated challenge levels. Mice were injected subcutaneously with phosphonomycin immediately following infection.

EXAMPLE 18

| Bacterial Strain | No. of Cells Inoculated (virulence) | $ED_{50}$ ($\mu$g phosphonomycin) |
|---|---|---|
| E. coli 2017 (parent strain) | $4.2 \times 10^6$ (10 $LD_{50}$'s) | 943 |
| Mutant $C_1$ | $4.7 \times 10^6$ (30 $LD_{50}$'s) | 12 |
| Mutant $C_2$ | $1.2 \times 10^7$ (9 $LD_{50}$'s) | 14 |

Thus, even though these mutants possess full virulence, they are controlled by remarkably low levels of phosphonomycin, implying that the uninduced wild-type strain displays in vivo far less than its full inducible capacity for responding to phosphonomycin. We conclude that it is possible to establish maximum levels of the L-α-glycerophosphate transport system and a correspondingly more efficacious therapy by phosphonomycin in any clinical situation (e.g. urinary tract or skin infections) where the absence of glucose ensures effective induction by coadministered potentiators (e.g. glycerol) reaching those sites.

EXAMPLE 19

Effect of Coadministered Glucose-6-Phosphate on the Susceptibility to Phosphonomycin, In Vitro and In Vivo of a Bacterial Variant That Had Aquired Resistance to Phosphonomycin During Therapy in Man.

The strains of *Escherichia coli* employed below represent, in the case of M 13, an isolate from the urine of an infected female just prior to her treatment with phosphonomycin, and in the case of M 21, an isolate of the drug-resistant organisms present in the urine of this individual after therapy for 7 days with the antibiotic. The in vitro susceptibility tests were performed in the manner described in Example 6. The in vivo, mouse protection trial was carried out as described in Example 9 following intraperitoneal challenge with the indicated number of organisms.

In Vitro Susceptibility Tests

| | Zones of inhibition (mm) surrounding discs bearing 30 $\mu$g of phosphonomycin alone, or in combination with 5 $\mu$g of glucose-6-phosphate. | |
|---|---|---|
| | Phosphonomycin alone | plus glucose-6-phosphate |
| E. coli M 13 | 19 | 28 |
| E. coli M 21 | 0 (less than 7 mm) | 20 |

Curative Efficacy of Phosphonomycin in Infected Mice ($ED_{50}$'s in mg)

| | Phosphonomycin alone | Phosphonomycin co-administered with 1 mg glucose-6-phosphate, disodium. |
|---|---|---|
| E. coli M 13 $3.7 \times 10^7$ cells $= 8$ $LD_{50}$'s | 0.25 | 0.035 |
| E. coli M 21 $1.2 \times 10^7$ cells $= 10$ $LD_{50}$'s. | 17.5* | 2.5 |

*At the highest drug level administered to this group, 20 mg per mouse, only 3 of the 5 infected animals were protected. In the other three groups complete protection was observed at no higher than twice the median level quoted.

Since the resistant strain retained the ability to respond to phosphonomycin upon co-addition of glucose-6-phosphate, we infer that the hexose-6-phosphate transport pathway is not significantly induced by endogenous substances in the natural urinary infections of man. When transport is evoked by the intentional coadministration of inducers, resistance to phosphonomycin should be prevented or overcome, and the therapeutic elimination of such strains should be made possible.

EXAMPLE 20

Effect of Coadministered Glucose-6-Phosphate on the Susceptibility to Phosphonomycin, In Vitro and In Vivo, of a Wild-Type, Inducible Bacterial Strain and A Non-Inducible Mutant Derived Therefrom.

A mutant designated 2017 A showing no additional response in vitro to phosphonomycin upon addition of glucose-6-phosphate was isolated from its parent, the naturally occurring pathogen *Escherichia coli* 2017 by the procedure described in Example 6 for the isolation of Strain MB 2489 A2 from its parent MB 2489. Mutant 2017 A showed a normal ability to metabolize glucose-6-phosphate. Its in vitro susceptibility to phosphonomycin, in vivo, relative to the parent strain, was determined twice in mouse protection trials described below, employing the protocol established in Example 9.

EXAMPLE 20

| In Vitro Susceptibility Tests | | |
|---|---|---|
| | Zones of inhibition (mm) surrounding discs bearing 30 $\mu$g of phosphonomycin alone, or in combination with 5 $\mu$g of glucose-6-phosphate, disodium. | |
| | Phosphonomycin alone | plus glucose-6-phosphate |
| E. coli 2017 | 18 | 27 |
| E. coli 2017 A | 17.5 | 18 |

Curative Efficacy of Phosphonomycin in Infected Mice ($ED_{50}$'s in mg)

| | Phosphonomycin alone | Phosphonomycin co-administered with 1 mg glucose-6-phosphate, disodium. |
|---|---|---|
| Trial I | | |
| E. coli 2017 $1 \times 10^6$ cells $= 9$ $LD_{50}$'s | 0.230 | 0.015 |
| E. coli 2017 A $1 \times 10^6$ cells $= 7$ $LD_{50}$'s | 0.166 | 0.284 |
| Trial II | | |
| E. coli 2017 $5 \times 10^6$ cells $= 13$ $LD_{50}$'s | 0.821 | 0.021 |
| E. coli 2017 A $9 \times 10^6$ cells $= 33$ $LD_{50}$'s | 1.420 | 1.130 |

The indifference of mutant 2017 A to the combination of glucose-6-phosphate with phosphonomycin in vitro, is reflected perfectly in vivo by the failure of coadministered glucose-6-phosphate to enhance the efficacy of phosphonomycin in treatment of mice infected by this mutant. Thus the normal potentiation by glucose-6-phosphate of phosphonomycin's curative effect must be attributed to its direct action on inducible infecting strains of bacteria and not by any host response that might be conjectured (such as enhanced drug absorption or immune response) which would have affected the mutant as favorably as the parent strain. The similar efficacy of phosphonomycin alone, against infections due to inducible and non-inducible organisms, implies that endogenous inducers are either absent from or at too low a level (in those areas of the body invaded by microorganisms) to evoke the biosynthesis of the hexose-6-phosphate transport system. Thus the manifest potential benefits resulting from induction of this system, require explicit administration of exogenous inducer by the therapist.

In accordance with this invention, the bacterial transport systems can be induced in infected animals employing smaller doses of potentiators, especially by the oral route, if degradation of the ester linkage by either bacterial, intestinal, liver, kidney, plasma, or urinary phosphatases is avoided. The preferred potentiators are carbohydrate esters of the formula:

wherein —$CH_2$— represents the terminal methylene group of R′—$CH_2$—OH, a pentose or hexose such as glucose, fructose, mannose, 2-deoxy-glucose, 2-amino-2-deoxyglucose, galactose, ribose; a 1-substituted ribitol such as riboflavin; or glycerol and Y′ is:

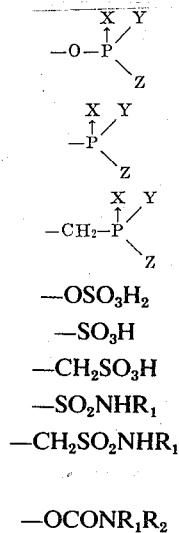

—$OSO_3H_2$

—$SO_3H$

—$CH_2SO_3H$

—$SO_2NHR_1$

—$CH_2SO_2NHR_1$ or

—$OCONR_1R_2$ wherein X, Y, Z, $R_1$ and $R_2$ are defined as above, and the salts thereof.

We claim:

1. A method of potentiating the activity of a phosphonomycin antibiotic in antibiotic therapy which comprises contacting susceptible bacteria with an effective amount of an inducer capable of providing a hexose-phosphate transport system or enhancing the α-glycerophosphate transport system for said bacteria and later or concomitantly contacting said bacteria with an effective amount of a phosphonomycin antibiotic.

2. The method of claim 1 wherein an inducer capable of providing a hexose-phosphate transport system is used.

3. The method of claim 1 wherein an inducer capable of providing a glucose-6-phosphate transport system is used.

4. The method of claim 1 wherein an inducer capable of enhancing the α-glycerophosphate transport system is used.

5. The method of claim 1 wherein the inducer is glucose-6-phosphate.

6. The method of claim 1 wherein the inducer is mannose-6-phosphate.

7. The method of claim 1 wherein the inducer is glucose-1-phosphate.

8. The method of claim 1 wherein the inducer is ribose-5-phosphate.

9. The method of claim 1 wherein the inducer is galactose-6-phosphate.

10. The method of claim 1 wherein the inducer is lactose.

11. The method of claim 1 wherein the phosphonomycin antibiotic is a salt of phosphonomycin.

12. The method of claim 1 wherein the inducer is administered concomitantly with the phosphonomycin antibiotic by parenteral administration.

13. The method of claim 1 wherein the inducer is administered parenterally and the phosphonomycin antibiotic orally.

14. An antibiotic composition comprising an effective amount of a phosphonomycin antibiotic, an effective amount of an inducer of a phosphonomycin transport system in bacteria, and a pharmaceutically acceptable carrier, said inducer being a substance capable of providing a hexosephosphate transport system or enhancing the α-glycerophosphate transport system.

* * * * *